(12) United States Patent
Minagawa

(10) Patent No.: US 6,563,519 B1
(45) Date of Patent: May 13, 2003

(54) INFORMATION PROCESSING APPARATUS, INFORMATION PROCESSING METHOD, INFORMATION PROCESSING PROGRAM FOR PERFORMING OUTPUT SETUP TO DEVICE APPARATUS, AND MEMORY MEDIUM STORING SUCH PROGRAM THEREIN

(75) Inventor: Tomonori Minagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/505,193

(22) Filed: Feb. 16, 2000

(30) Foreign Application Priority Data

Feb. 18, 1999 (JP) ............................................. 11-039948

(51) Int. Cl.⁷ ............................................. G06F 15/00
(52) U.S. Cl. ....................................... 345/764; 707/200
(58) Field of Search ................................. 345/764, 771, 345/773, 748, 810, 840; 709/207, 202; 707/200, 207, 202, 205

(56) References Cited

U.S. PATENT DOCUMENTS 5,978,559 A * 11/1999 Quinion ...................... 345/700
5,999,945 A * 12/1999 Lahey et al. ................. 707/200
6,024,505 A * 2/2000 Shinohara ................... 707/102
6,388,687 B1 * 5/2002 Brackett et al. ............ 345/810

* cited by examiner

Primary Examiner—Cao H. Nguyen
(74) Attorney, Agent, or Firm—Fitzpatrick, Cella, Harper & Scinto

(57) ABSTRACT

In an output setup to a device apparatus, when the contents of a plurality of setting items are changed in a lump by using a compound setup consisting of a plurality of setting items, a mismatching of the set contents and a function of the device apparatus is avoided. For this purpose, according to the invention, when the compound setup can be used for a plurality of device apparatuses, the compound setup which is used for the designated device apparatus is selected, and in case of performing the output setup to the designated device apparatus by using the selected compound setup, whether the output can be performed by the contents of each setting item of the compound setup in the device apparatus or not is discriminated in accordance with the function of the device apparatus.

80 Claims, 17 Drawing Sheets

FIG. 20

| DIRECTORY |
|---|
| 1ST DATA PROCESSING PROGRAM<br>PROGRAM CODES FOR FLOWCHART OF FIG. 4 |
| 2ND DATA PROCESSING PROGRAM<br>PROGRAM CODES FOR FLOWCHART OF FIG. 6 |
| 3RD DATA PROCESSING PROGRAM<br>PROGRAM CODES FOR FLOWCHART OF FIG. 7 |
| 4TH DATA PROCESSING PROGRAM<br>PROGRAM CODES FOR FLOWCHART OF FIG. 10 |
| 5TH DATA PROCESSING PROGRAM<br>PROGRAM CODES FOR FLOWCHART OF FIG. 14 |
| 6TH DATA PROCESSING PROGRAM<br>PROGRAM CODES FOR FLOWCHART OF FIG. 18 |
| 7TH DATA PROCESSING PROGRAM<br>PROGRAM CODES FOR FLOWCHART OF FIG. 19 |
| BUFFER FOR STORING CURRENT SETUP |
| AREA FOR STORING "FAVORITE" |
| AREA FOR STORING DEVICE OPTION |

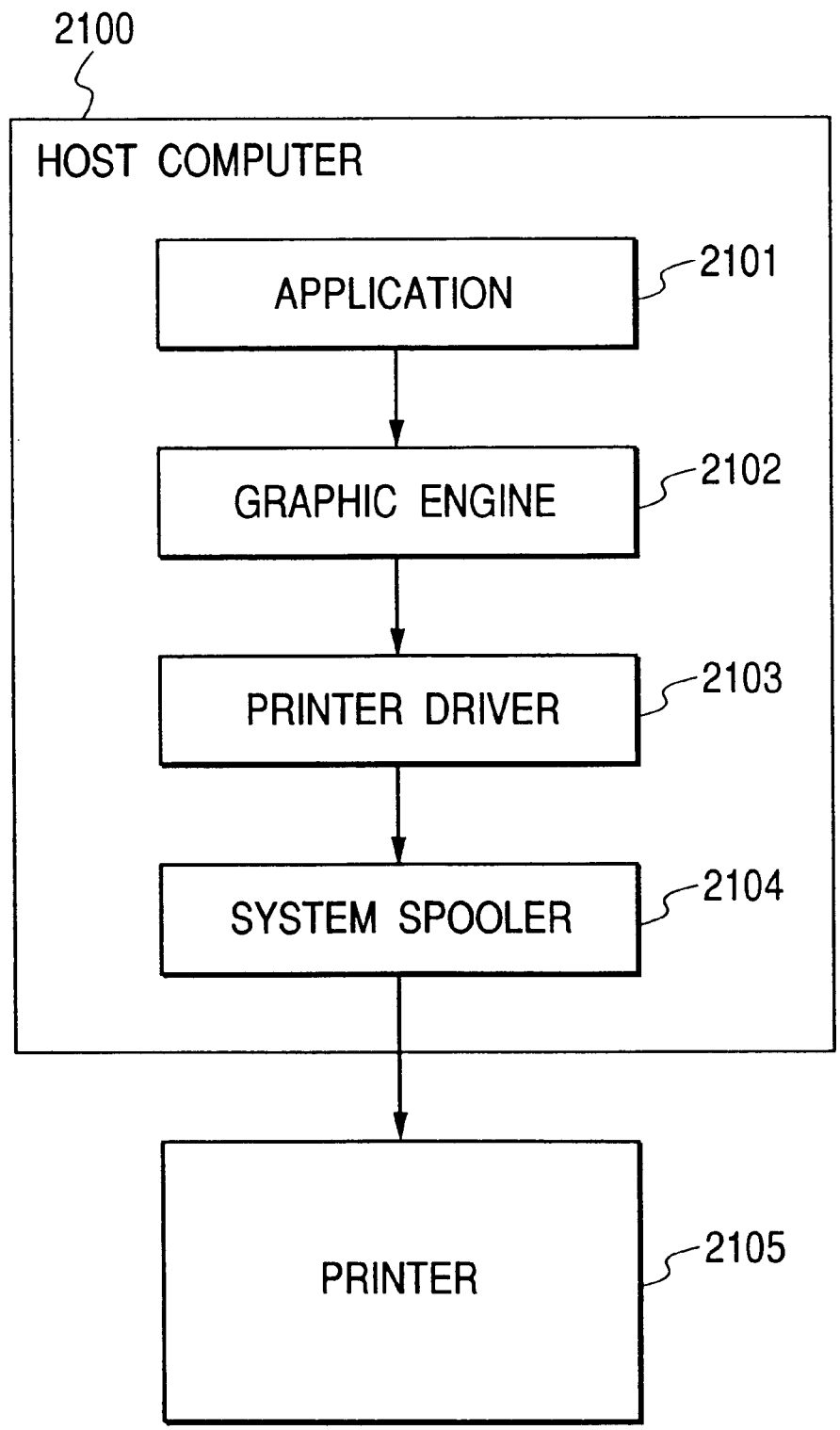

INFORMATION PROCESSING APPARATUS, INFORMATION PROCESSING METHOD, INFORMATION PROCESSING PROGRAM FOR PERFORMING OUTPUT SETUP TO DEVICE APPARATUS, AND MEMORY MEDIUM STORING SUCH PROGRAM THEREIN

BACKGROUND OF THE INVENTION

1. Field of the Invention

The invention relates to an information processing apparatus, an information processing method, and an information processing program for efficiently performing a setup by handling a plurality of setting items in a lump in a user interface (hereinafter, simply referred to as UI) and relates to a memory medium in which a processing procedure for realizing such an information processing program has been stored.

2. Related Background Art

Generally, in an information processing apparatus, the user performs various setups through the UI (User Interface). There is an information processing apparatus having a function such that when there are many setting items and there is a complicated dependent relationship among the setting items or the like, set values-of some setting items are combined to one group and registered, and the set values of a plurality of setting items are changed in a lump by selecting the group by the user.

For example, in a printer driver, the set values regarding a print quality upon printing such as graphic mode, resolution, color setup, replacement of TrueType, and the like are combined as one group and previously registered in correspondence to respective icons. Upon printing, by selecting a desired one of a plurality of icons in accordance with a print purpose, the user can change the set values of a plurality of setting items in a lump. This function is called a "print purpose setup".

SUMMARY OF THE INVENTION

In the "print purpose setup", only the setting items regarding the graphics in the printer driver are mainly used as targets. Therefore, even if the set values of a plurality of setting items can be changed in a lump, the set values of the setting items can be changed in a lump only on a sheet unit basis. Therefore, unless the sheet to which the setting items to be changed belong is opened, the user cannot change the set values of the setting items.

On the other hand, there is an apparatus such that a range of setting items which can be registered as one group is widened to a plurality of sheets. This function is called a "favorite". According to "favorite", almost all of the setting items on the UI are used as registration targets. Thus, the user can also change the set values of the setting items of an arbitrary sheet in a lump. Therefore, an inconvenience as mentioned above in the "print purpose setup" is solved and the user also can efficiently use a variety of functions of the printer.

However, since there are many setting items which can be changed in "favorite", there is a case where conflict problem occurs with regard to the device option. For example, even when the user sets a two-sided (hereinafter, simply referred to as "2-sided") print mode, unless a 2-sided unit is installed in a printer, a 2-sided print cannot be performed. Similarly, even if the user sets a mode in which a stapler or the like is used, unless a dedicated finisher is attached to the printer, the stapler or the like cannot be used. However, if the set values of many setting items are changed in a lump by "favorite", the setup is performed while their device conflicts occur.

In a case where although "favorite" is formed when a dedicated device option is installed, the device option is removed upon printing, a case where "favorite" is copied to another device in which the dedicated device option is not installed, or the like, an inconvenience such that a setting item which cannot be actually executed is set by "favorite" can occur.

In the invention, therefore, when "favorite" is selected, an installing situation or the like of the current device option is checked. When the setting item which cannot be executed is set, a message showing such a fact is displayed and the set value is adjusted. As a method of adjusting the set value, there is a method whereby a driver discriminates about the necessity of adjustment and adjusts the set value to a default value or the like or a method whereby the user can select one of several adjusting methods.

Particularly, as target setting items, there are setting items regarding a 2-sided print, a bookbinding print, a paper supply port, a finisher (having a finishing function such as a stapler or the like), processes depending on a memory, and the like.

When the set contents of "favorite" are imported from a file, a situation such that "favorite" is copied to a client of a quite different device environment is also considered. Even in this case, by checking the device environment, adjusting the set values, and registering them to "favorite", a troublesomeness such that a message is outputted every time "favorite" is selected can be avoided.

To accomplish the above objects, according to the invention, in case of performing an output setup to a device apparatus by using a compound setup comprising a combination of a plurality of setting items, if the compound setup can be used for a plurality of device apparatuses, when the compound setup which is used for the designated device apparatus is selected and the output setup for the designated device apparatus is performed by using the selected compound setup, whether an output can be performed on the basis of the contents of each setting item of the compound setup or not is discriminated in the relevant device apparatus in accordance with the function of this device apparatus.

Further, according to the invention, in the case where it is determined in accordance with the function of the relevant device apparatus that the output cannot be performed on the basis of the contents of the setting items in the designated device apparatus, the setup is performed by the contents according to the function of the device apparatus in place of the contents of the setting items.

Further, according to the invention, in case of performing the setup in place of the contents of the setting items in accordance with the function of the device apparatus, its situation is notified to the user.

Further, according to the invention, in case of performing the setup in place of the contents of the setting items in accordance with the function of the device apparatus, the user is allowed to select its replacing method.

Further, according to the invention, in case of performing the setup in place of the contents of the setting items in accordance with the function of the device apparatus, the user is allowed to confirm whether they are replaced or not.

Further, according to the invention, in the case where the compound setup is read out from a file land stored in memory means and the compound setup is stored in the memory means, whether an output can be performed on the basis of the contents of each setting item in the device apparatus or not is discriminated in accordance with a function of the device apparatus.

Further, according to the invention, in the case where it is determined in accordance with the function of the relevant device apparatus that the output cannot be performed on the basis of the contents of the setting items in the designated device apparatus, the compound setup is stored by the contents according to the function of the device apparatus in place of the contents of the setting items.

Further, according to the invention, in case of storing the compound setup in place of the contents of the setting items in accordance with the function of the device apparatus, its situation is notified to the user.

Further, according to the invention, in case of storing the compound setup in place of the contents of the setting items in accordance with the function of the device apparatus, the user is allowed to select its replacing method.

Further, according to the invention, in case of storing the compound in place of the contents of the setting items in accordance with the function of the device apparatus, the user is allowed to confirm whether they are replaced or not.

Further, according to the invention, the function of the device apparatus is stored.

Further, according to the invention, the function of the device apparatus relates to the presence or absence of an installation of the device apparatus.

Further, according to the invention, the function of the device apparatus is a 2-sided printing function of the device apparatus.

Further, according to the invention, the function of the device apparatus is a stapling function of the device apparatus.

Further, according to the invention, the function of the device apparatus is a bookbinding printing function of the device apparatus.

Further, according to the invention, the function of the device apparatus is a function regarding a cassette stage of the device apparatus.

Further, according to the invention, the function of the device apparatus is a function regarding a memory capacity of the device apparatus.

Further, according to the invention, the compound setup denotes that in case of performing the output setup by using a plurality of setup sheets in a user interface, a plurality of setting items existing over a plurality of setup sheets are combined.

Further, according to the invention, the output setup is an output setup in a printer driver.

Further, according to the invention, the output setup is an output setup in the printer driver by the printing operation in an application.

BRIEF DESCRIPTION OF THE DRAWINGS

FIG. 20 is a diagram showing a memory map of a memory medium to store a program and data regarding the present invention; and FIG. 21 is a constructional diagram showing a functional block of a print system.

DETAILED DESCRIPTION OF THE PREFERRED EMBODIMENTS

An embodiment of the invention will now be described hereinbelow with reference to the drawings.

Figure 1:
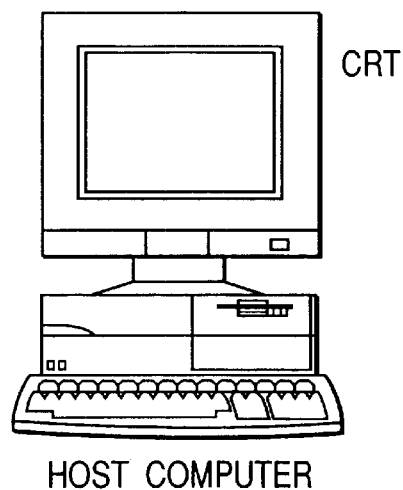
FIG. 1 is a diagram showing an example of a system construction to which the invention is applied.

FIG. 1 is a diagram showing an external view of a data processing apparatus to which the invention can be applied. The data processing apparatus is a so-called personal computer (PC) and constructed by a displays a data processing main body (including a control board, a hard disk, a floppy disk drive, a CD-ROM drive), an input device (a keyboard and a pointing device (not shown)), and the like.

Figure 2:
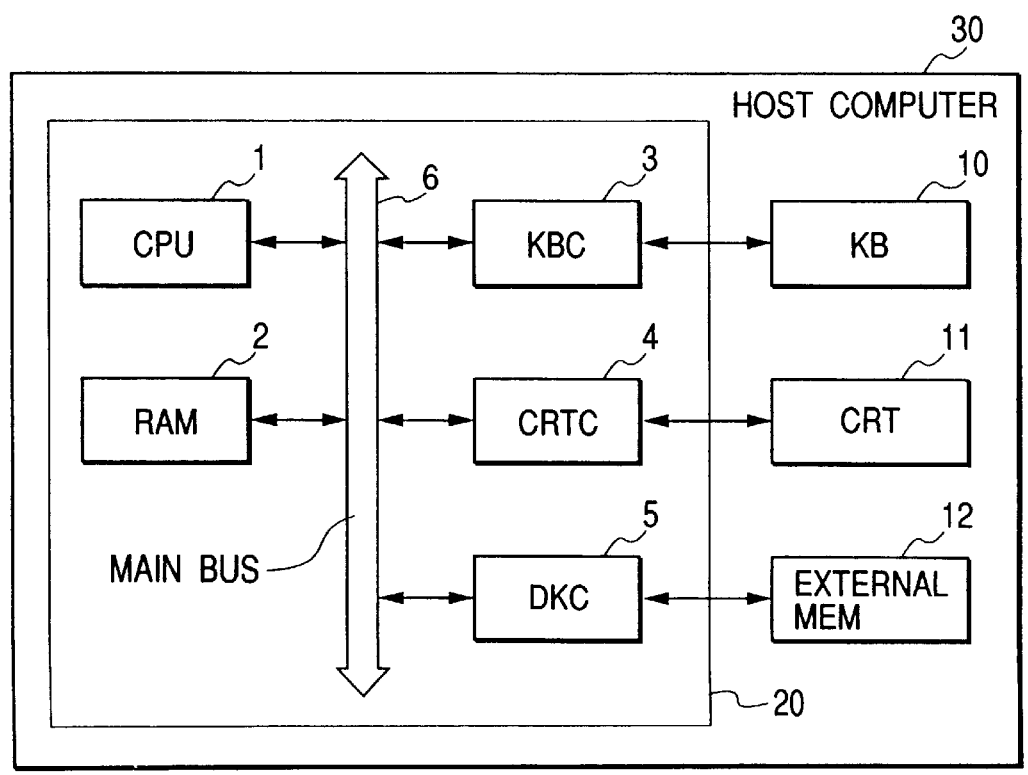
FIG. 2 is a block constructional diagram of a host computer.

FIG. 2 is a block diagram showing a control construction of the data processing apparatus of FIG. 1. In a host computer 20, a CPU 1 reads out various programs such as control program (also including a control program based on flowcharts shown in FIGS. 4, 6, 7, 10, 14, 18, and 19), system program, application program, and the like from an external memory 12 through a disk controller (DKC) 5 into an RAM 2, executes them, and performs various data processes. The DKC 5 controls accesses to the external memories such as FD, HD, CD-ROM, MD, MO, and the like.

The RAM 2 is constructed so that its capacity can be expanded by an option RAM or the like (not shown) and is mainly used as a work area of the CPU 1.

A keyboard controller (KBC) 3 controls a key, input from a keyboard 10 or the pointing device (not shown). A CRT controller (CRTC) 4 controls a display of a CRT display (CRT) 11. In the embodiments of the invention, the CPU 1 controls the RAM 2, KBC 3, CRTC 4, and DKC 5 through a main bus 6 unless otherwise specified.

In the system constructed as mentioned above, when the user changes the setup through the user interface (UI) of the application or device driver, the host computer receives the input from the KB 10 or the pointing device (not shown) by the user and displays its state or process onto the CRT 11.

FIG. 21 is a block diagram showing a functional construction of a print system in which a printing apparatus such as a printer or the like and the host computer are connected by a local interface (Centronics interface or USB interface) or a network (Ethernet).

Each block in a host computer 2100 in FIG. 21 shows a function which is realized by executing a program by the CPU 1 in FIG. 2. The program corresponding to each of an application 2101, a graphic engine 2102, a printer driver 2103, and a system spooler 2104 is stored as a file in the external memory 12 in FIG. 2. In the case where the programs are executed, the OS or an upper program (module) which uses the program (module) loads the program into the RAM 2.

The application 2101 and printer driver 2103 can be supplied from an FD or a CD-ROM (not shown) as an external memory 12. When the user executes a printing operation for a printer 2105 by the application 2101, the application 2101 first outputs (draws) by using the graphic engine 2102 which has been loaded in the RAM 2 and can be executed.

The graphic engine 2102 generally provides a common interface for graphics which does not depend on an output device such as printer, display, or the like to the application.

The graphic engine 2102 similarly loads the printer driver 2103 prepared for every printing apparatus into the RAM 2 from the external memory 12 and converts an output of the application 2101 to a control command of the printer by using the printer driver 2103. In this instance, the user can perform a print setup to the printer by using the user interface of the printer driver. In accordance with the print setup, the printer driver 2103 forms a control command of the printer.

The formed printer control command is outputted to the printer 2105 via the interface by the system spooler 2104 loaded in the RAM 2 by the OS.

Although there is a case where "favorite" is formed or read out in the invention, if the "favorite" is formed, it is stored in the RAM 2 or external memory 12 unless otherwise specified.

Figure 3:
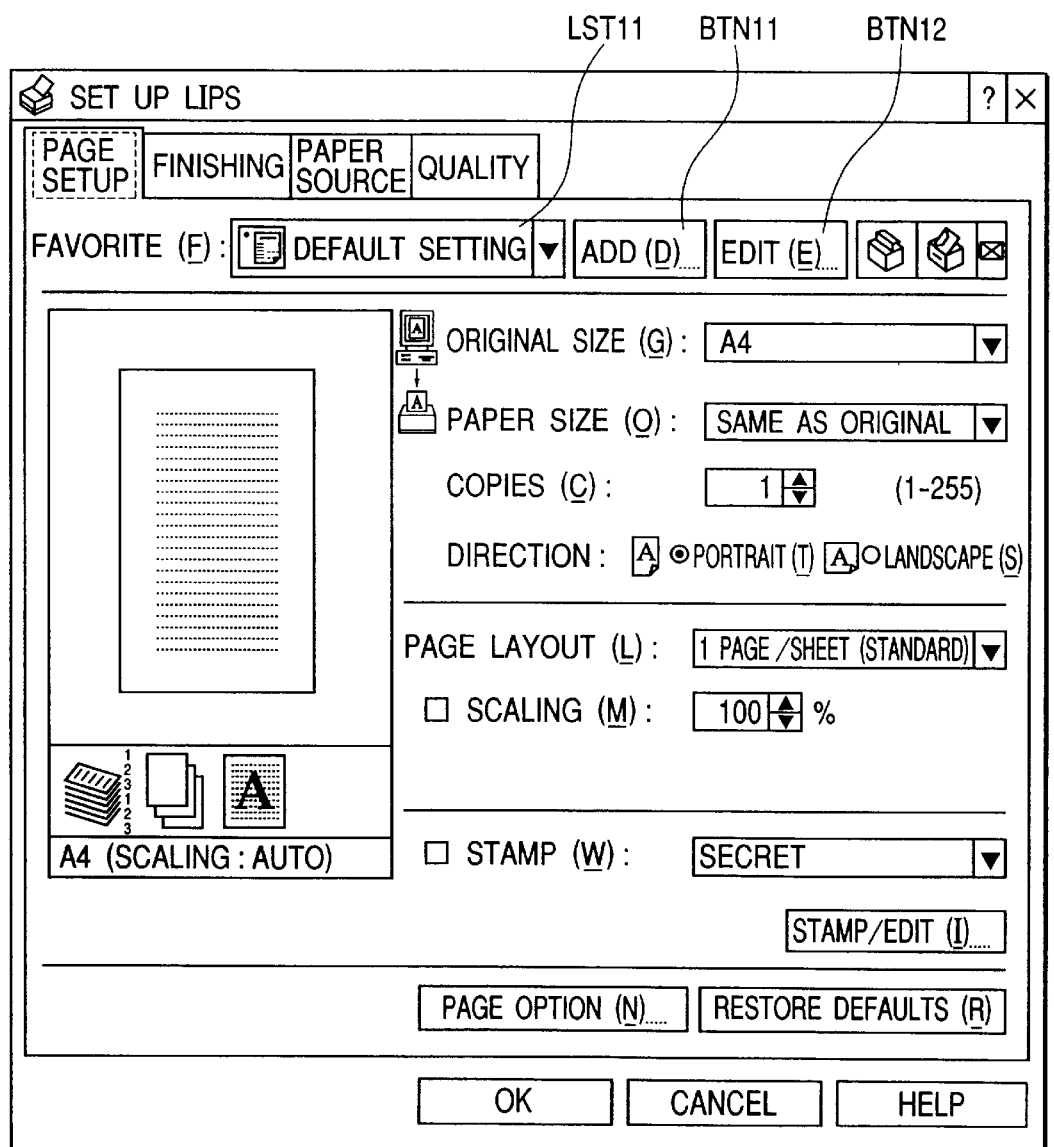
FIG. 3 is a diagram showing an example of a dialog for operating "favorite"

DLG1 shown in FIG. 3 is an example of a dialog displayed on the CRT 11 shown in FIG. 2. The user can select, add, and edit the "favorite" by the dialog Hereinlater, the main substance of the process is the CPU 1 in case of the hardware and is a program which is executed by the CPU 1 in case of the software unless otherwise specified.

[Whole Flow]

Figure 4:
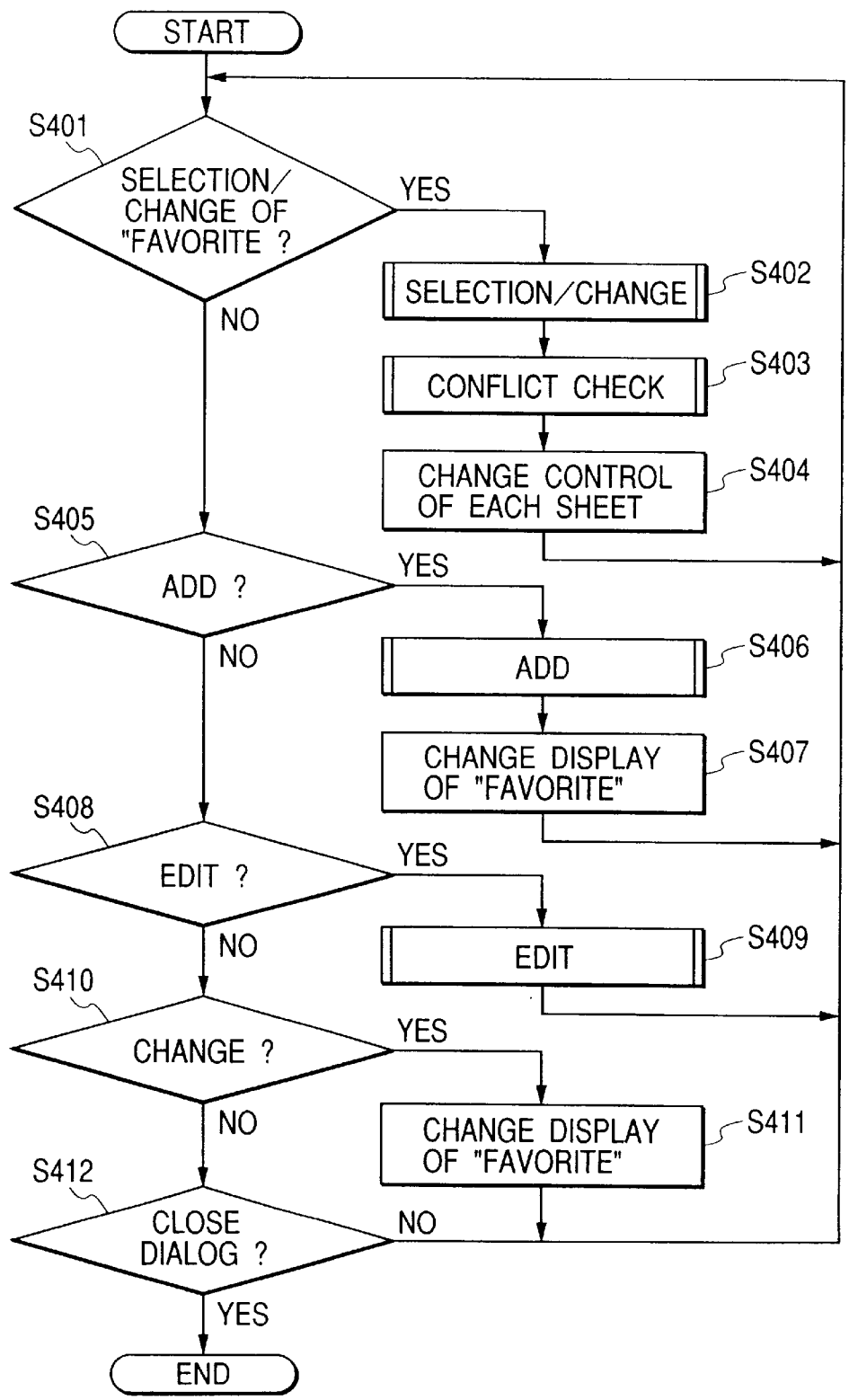
FIG. 4 is a diagram showing a flowchart showing the whole flow of "favorite"

A flow of processes regarding "favorite" will now be described hereinbelow with reference to the example of the dialogues in FIG. 3 and a flowchart of FIG. 4.

First, when current "favorite" is selected and changed by the user in a combo box LST11 of DLG1 (YES in step S401), a series of processes regarding the selection change is executed (the details will be, explained hereinlater) (step S402). A process to check a conflict regarding the setup of the printing to be executed from now on (hereinafter, referred to as a current setup) is performed (the details will be explained hereinlater) (step S403). A control (set values of setting items) on each sheet is changed in accordance with the current "favorite" and a result of the conflict check (step S404).

Figure 9:
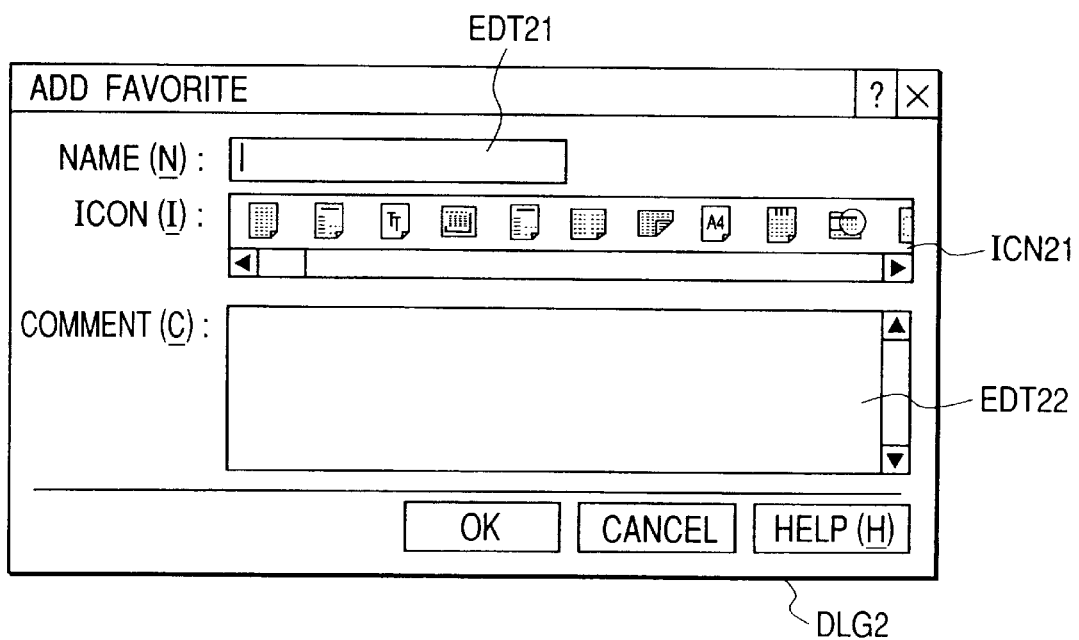
FIG. 9 is a diagram showing an example of a "favorite" adding dialog.

When an "add" button BTN11 is depressed (YES in step S405), DLG2 shown in FIG. 9 is displayed and a series of processes regarding the addition is performed (the details will be explained hereinlater) (step S406). A newly added name is displayed in LST11 so as to become current (step S407).

Figure 13:
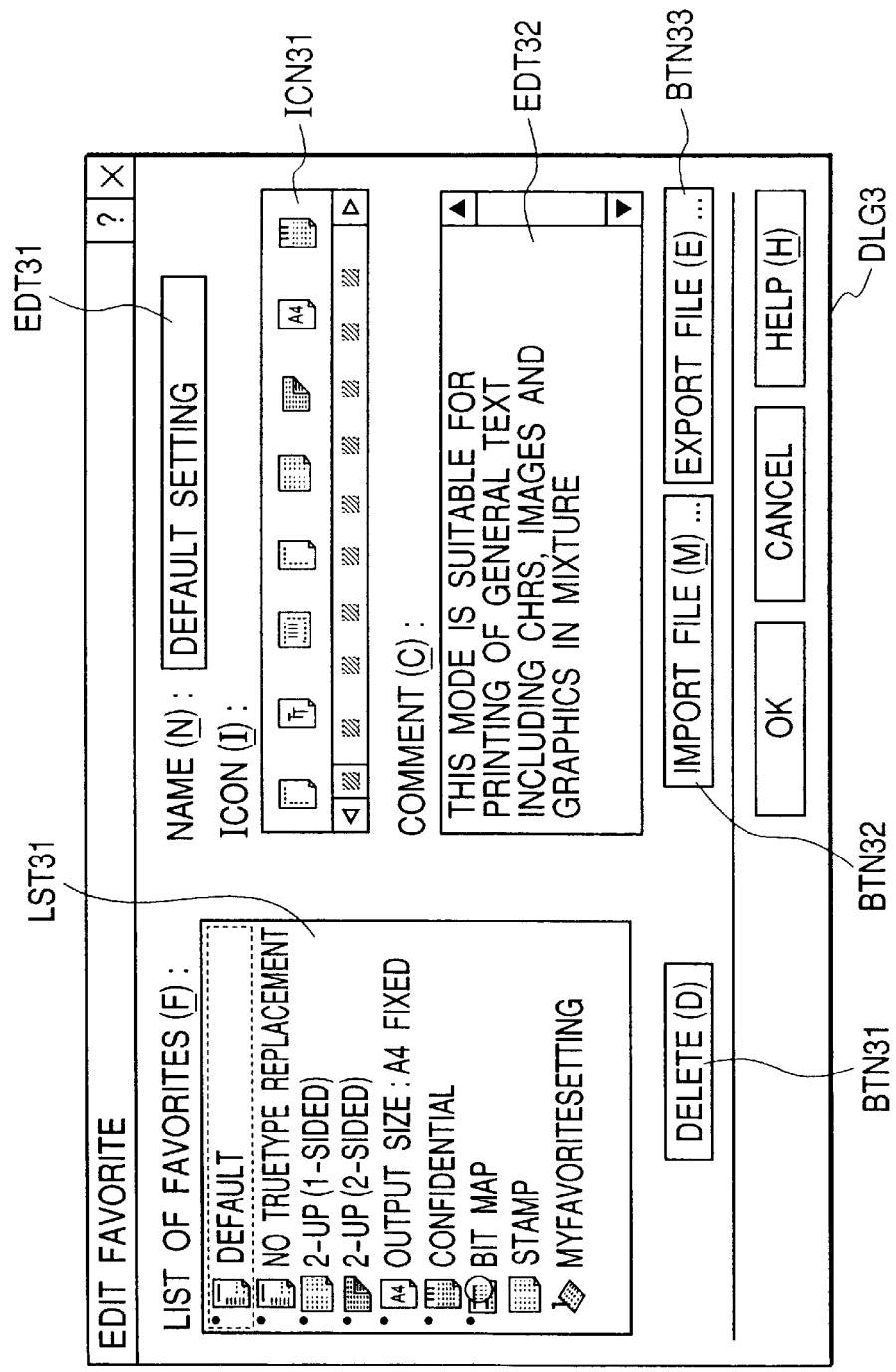
FIG. 13 is a diagram showing an example of a "favorite" editing dialog.

When an "edit" button BTN12 is depressed (YES in step S408), DLG3 shown in FIG. 13 is displayed and a series of processes regarding the edition of "favorite" is performed (the details will be explained hereinlater) (step S409).

Figure 5:
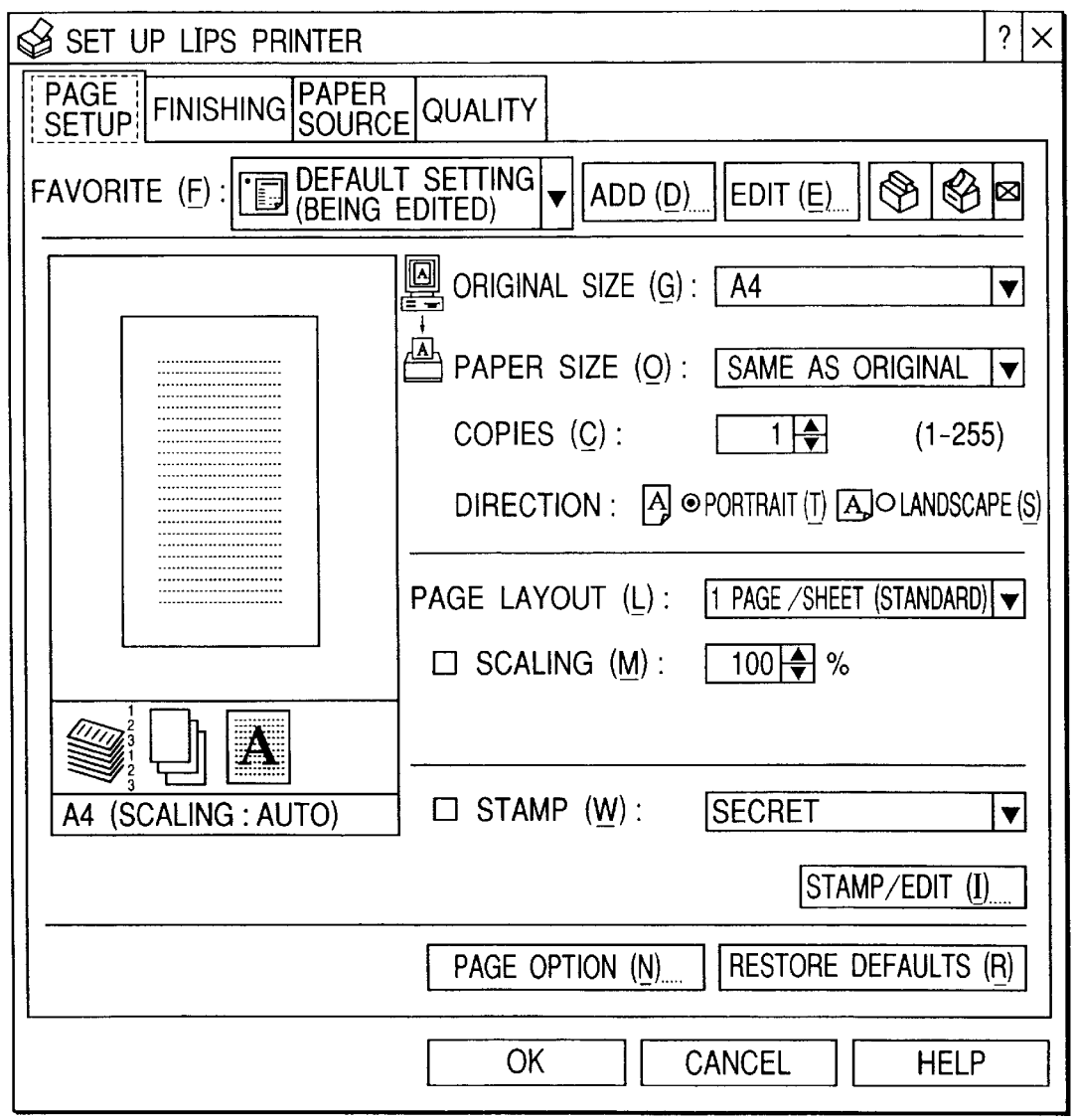
FIG. 5 is a diagram showing an example of a display of "favorite" when setting items are changed.

When the set contents of the setting items in the other cases are changed (YES in step S410), since this means that the set contents of "favorite" that is being selected are changed, the display of LST11 is adjusted in order to indicate it (step S411). For example, the display color is changed from black to another color or a text which is displayed is changed as shown in FIG. 5.

The above processes are executed until the dialog is closed (step S412).

[Processing Flow for Selection Change of "Favorite"]

Figure 6:
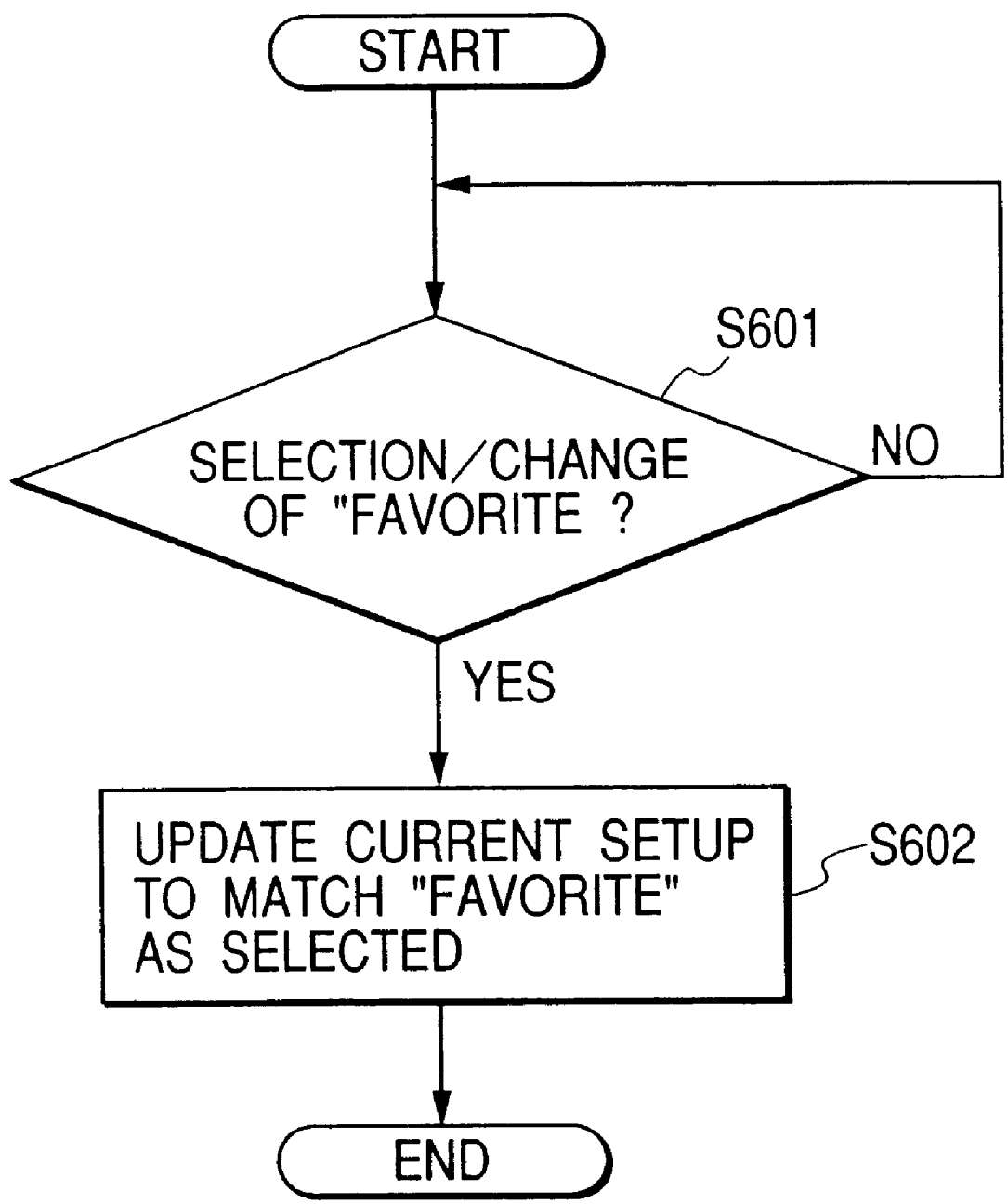
FIG. 6 is a diagram showing a flowchart for processes when "favorite" is selected.

A series of processes regarding the selection change of "favorite" in (step S402) of the flowchart of FIG. 4 will now be described with reference to a flowchart of FIG. 6.

When the selection change of "favorite" is determined (YES in step S601), a buffer area to hold the current set contents is updated by the set contents of the selected "favorite" (step S602). Targets to be changed are all controls (set values of all setting items) on the UI including not only a current sheet (sheet of "page setup" in FIG. 3) but also an inactive sheet (sheet of "finishing", "paper source", and "quality" in FIG. 3). Even if the change targets are selected from any sheet, they are the same change targets.

As specific examples of the setting items in which the set values can be registered and changed in a lump by "favorite", there are an input/output paper size, a direction of the paper, the number of copies, a page layout (Nup, poster, etc.), a scaling, a stamp, an overlay, a print mode (1-sided, 2-sided, bookbinding print), details of a bookbinding print, a binding, direction, a binding margin, a paper ejecting mode (sort, staple, etc.), a stapling position, a paper supply mode (the same paper supply for all pages, different paper supply for the first and last pages, etc.), a name of paper, a print purpose, a resolution, a color setup, etc.

[Process for Conflict Check]

Figure 7:
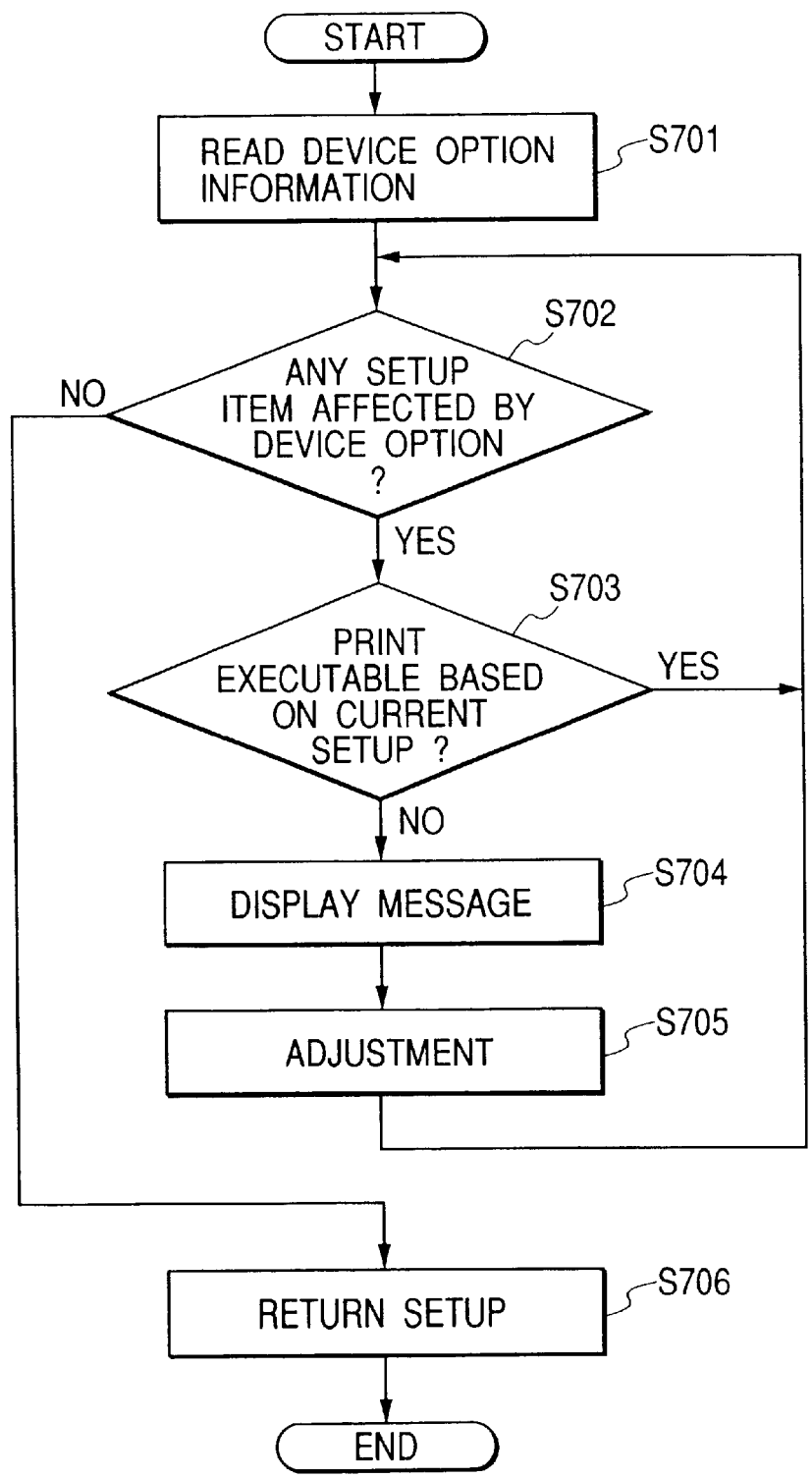
FIG. 7 is a diagram showing a flowchart for processes of a conflict check depending on a device option.

The process for conflict check in step S403 of the flowchart of FIG. 4 will now be described with reference to a flowchart of FIG. 7.

The "favorite" function uses the set values of almost all of the setting items existing on the UI as registration targets. However, among the setting items, there are setting items such that the printing process based on the set values of the setting items can be actually executed and setting items in which the printing process cannot actually be executed because the setting items depend on a device environment, particularly, since they depend on a device option equipped for the device.

Therefore, even if some set contents are selected by "favorite", the set contents cannot always be executed as they are in the current device environment. To cope with such a situation, a process for a conflict check according to the device option equipped for the device (a check about the mismatching and an adjusting process of the setup) will now be described.

First, device option information held in a device option registering unit (on a registry or a specific memory) is read into a work area (step S701). The setting of the device option (for example, a finisher, a paper supply cassette, a memory, etc.) will be described hereinlater.

The setting items which are affected by the equipped device option will now be sequentially checked (step S702). Whether the printing process based on the current set values can be executed or not is discriminated (step S703).

Figure 8:
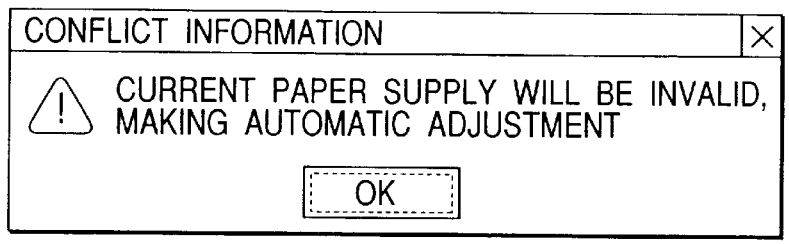
FIG. 8 is a diagram showing an example of a message when a conflict occurs.

When it is determined in step S703 that the printing process cannot be executed according to the registered set contents (set values) (NO in step S703), a message showing such a fact is displayed as shown in FIG. 8 (step S704). The set contents (set values) are adjusted (step S705). If there are a plurality of ways of adjustment, it is also possible to display a message indicative of such a fact to thereby allow the user to select one of them. The processes in steps S703 to S705 are executed with regard to all of the setting items which are affected by the device option.

Some examples of the device conflict checking process will be mentioned here.

When "favorite" in which the 2-sided mode has been registered is selected although the 2-sided unit is not installed, the print mode is changed to the 1-sided mode.

When "favorite" in which there is a stapler is selected although a finisher which can staple is not installed, the print mode is changed to the no-staple mode.

When "favorite" in which the bookbinding print mode has been registered is selected although a finisher which can perform the bookbinding is not installed, the print mode is changed to the normal print mode without bookbinding.

When "favorite" in which the middle binding mode has been registered is selected although a finisher which can perform the middle binding (function to staple the folds in the bookbinding print mode) is not installed, the print mode is changed to the bookbinding print mode without middle binding.

When "favorite" in which a cassette stage which is not installed has been registered is selected (a case such that although only two cassettes have been installed in the main body, cassette 6 is registered), the print mode is changed to "auto" of default.

When "favorite" in which a super fine mode such that the printing cannot be performed unless a memory is expanded has been registered is selected although a memory capacity is insufficient, the print mode is changed to a print of default setup (normal mode).

Other whole processes depending on the memory are also changed to defaults.

Finally, the set contents are returned in state where all of the conflicts are eliminated by the adjusting process (step S706).

[Registering Flow]

Figure 10:
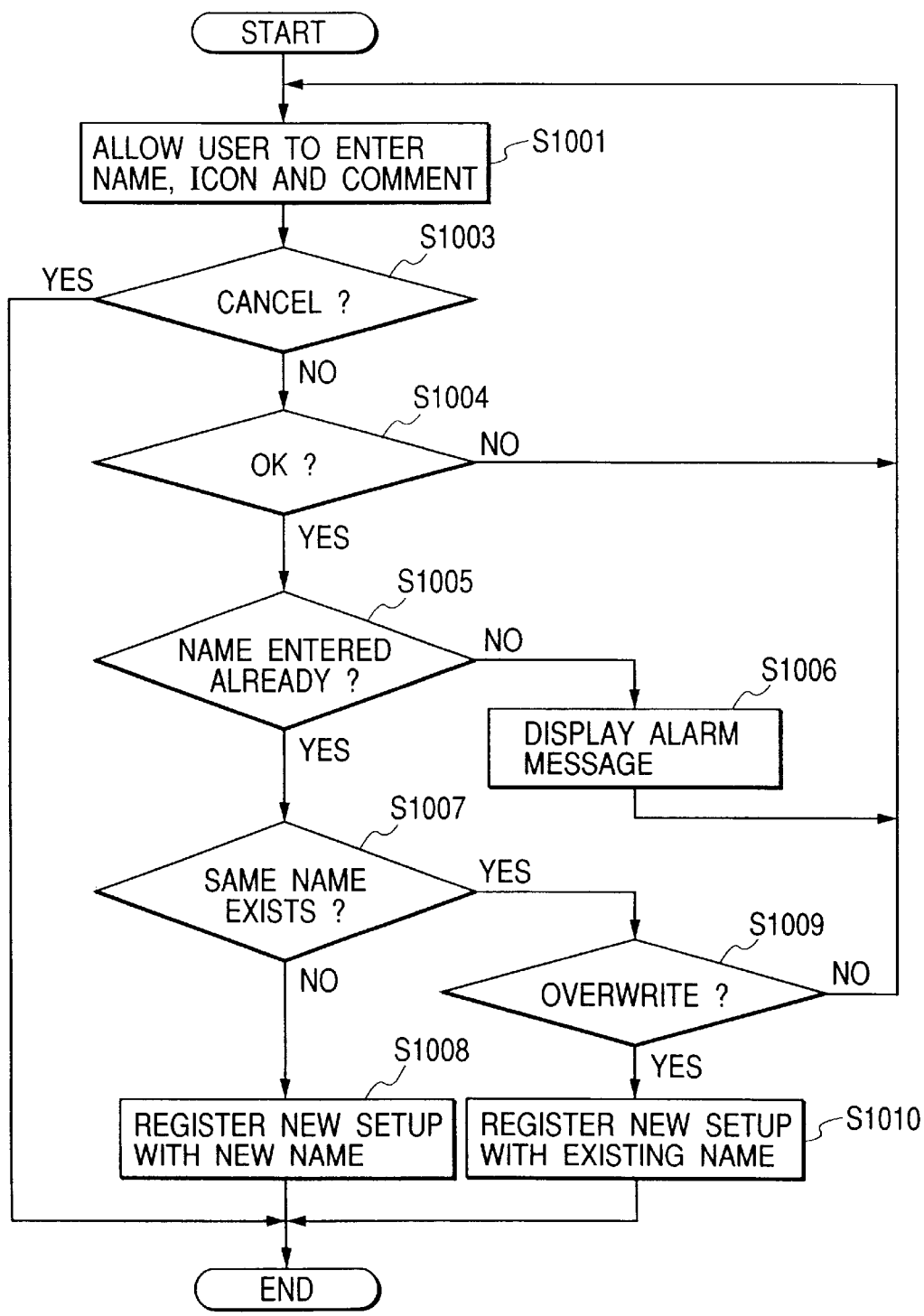
FIG. 10 is a diagram showing a flowchart for a "favorite" adding process.

A series of processes regarding the addition of "favorite" in step S406 of the flow of FIG. 4 will now be described with reference to a flowchart of FIG. 10. DLG2 shown in FIG. 9 is an example of a dialog which can add a name, an icon, a comment, or the like of "favorite" to be added.

First, the apparatus waits for the input of the name, icon, comment, etc. by the user (step S1001). When a "cancel" button is depressed (YES in step S1003), the processing routine is finished without performing a process. When an "OK" button is depressed (YES in step S1004), an additional process is started.

Figure 11:
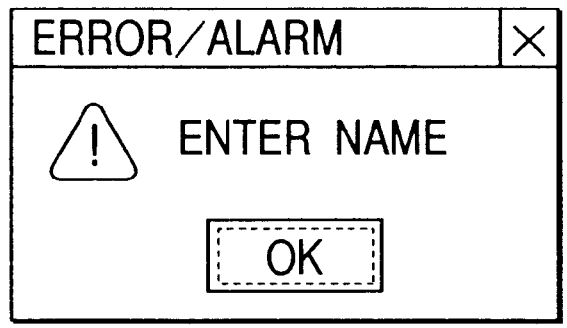
FIG. 11 is a diagram showing an example of a message when no name is inputted.

First, whether the name has been inputted or not is discriminated (step S1005). If it is not inputted, a message is displayed as shown in FIG. 11 (step S1006), thereby promoting the user to reinput. Since the name becomes a key to manage "favorite", it is inevitable to input the name. Subsequently, whether the inputted name is overlapped to the name which has already been added or not is discriminated (step S1007). If there is no same name, the contents of the current setup are added to "favorite" DB by using,the inputted name as a key (step S1008).

Figure 12:
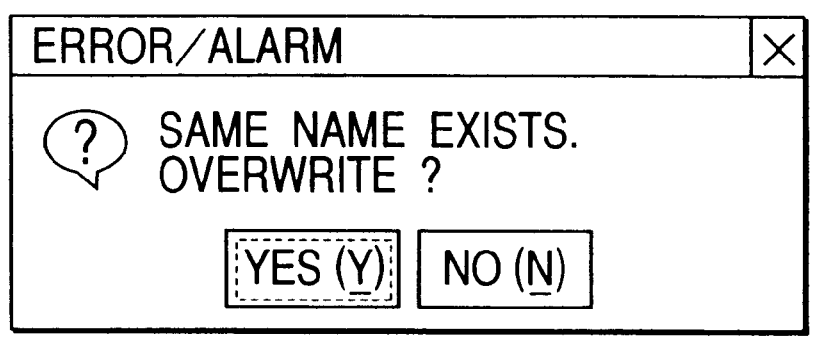
FIG. 12 is a diagram showing an example of a message when an overwrite is confirmed.

If the same name which has already been inputted exists in step S1007, whether the overwriting is performed or not is confirmed to the user (step S1009). After that, if YES, the name is replaced with the existing name in "favorite" DB and registered (step S1010). If the name is not overwritten, the name is reinputted. FIG. 12 shows an example of an overwrite confirmation message.

Registration targets are not limited to the current sheet but include all controls (set values of all of the setting items) on the UI including the inactive sheet. Even if setting items are registered from any sheet, the registration targets are the same.

The above processes are continued until the "OK" button or "cancel" button of the dialog is depressed.

[Editing Flow]

A series of processes regarding the edition of "favorite" in step S408 in the flow of FIG. 4 will now be described with reference to an example of the dialog in FIG. 13 and a flowchart of FIG. 14.

The user selects any "favorite" from a list LST31 of "favorites" of a dialog DLG13 shown in FIG. 13. A default setup (default setting, no replacement of TrueType, etc.) which has initially been prepared in the program and a user setup (My Favorite Setting) added by the user are listed in the LST31.

A flow of processes in the edition of "favorite" will now be described with reference to FIG. 14.

When any "favorite" is selected by the user (YES in step S1401), if it is a default setup (YES in step S1402), management information such as name, icon, comment, etc. of "favorite", a "delete" button, and the like are disabled to be edited so that the user cannot edit (step S1403). In FIG. 13, since "default setting" as a default setup has been selected by the user, a name (LST31) of "favorite", an icon (ICN31), a comment (EDT32), and a "delete" button (BTN31) are lightly displayed, thereby showing that the edition is impossible.

Figure 15:
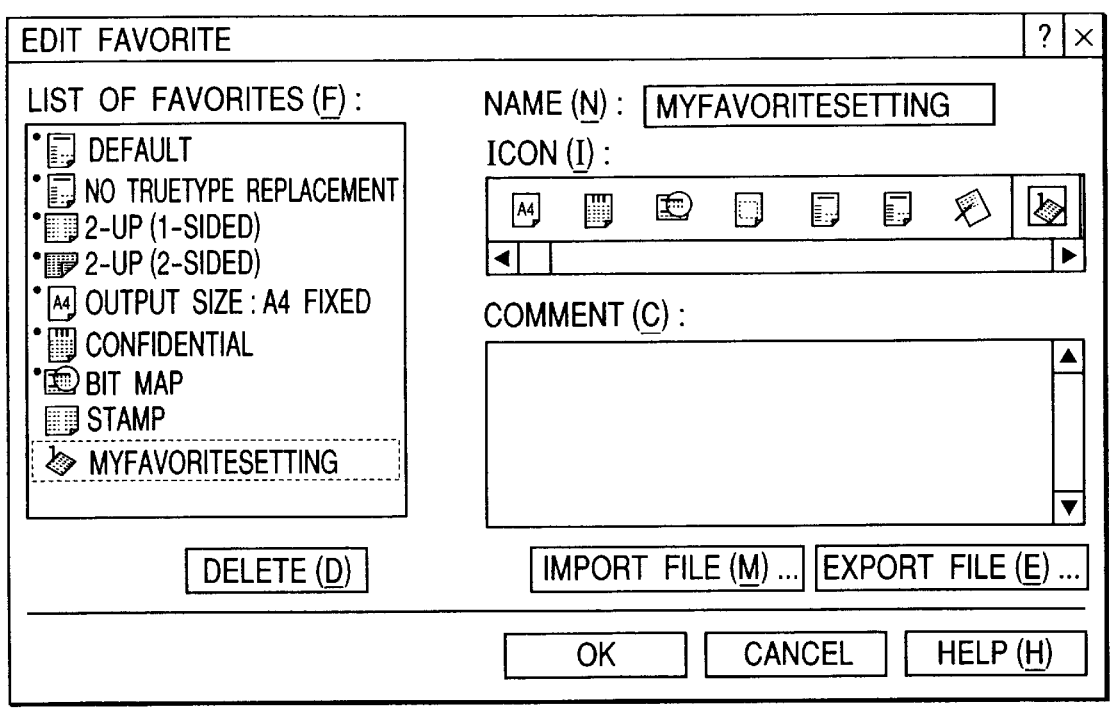
FIG. 15 is a diagram showing a dialog when the user setup "favorite" is selected.

If it is the user setup, all of them are enabled to be edited (step S1404) and management information (name, icon, comment, etc.) regarding the "favorite" is displayed. FIG. 15 shows an example of the UI at the time when "My Favorite Setting" of the user setup is selected by the user. By displaying the background of the icon in black, the user can know which ones of the icons have been registered. The list of "favorites" is also similarly displayed by a black background in a manner such that the "favorite" selected at present by the user can be known.

Figure 16:
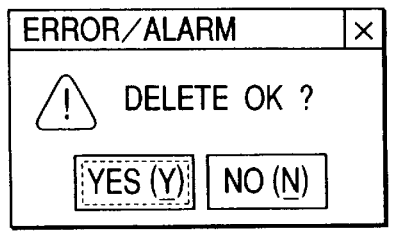
FIG. 16 is a diagram showing an example of a message at the time of confirmation of deletion.

When "favorite" of the user setup is selected, the user can edit the management information (step S1405). When a "delete" button BTN31 is depressed by the user (YES in step S1407), a confirmation message as shown in FIG. 16 is displayed and, after that, the "favorite" is deleted from the "favorite" DB (step S1408).

When an "export file" button BTN33 is depressed (YES in step S1409), the current setup is saved in the file, thereby enabling the file to be exported to t he other (step S1410). When a "import file" button BTN32 is depressed (step S1411), an importing process for loading the "favorite" saved in the file and adding it into the "favorite" DB is executed (step S1412). In case of closing the dialog (YES in step S141,8), when there is a change in contents by the edition of the user (YES in step S1419), a process to leave the contents after the change into the "favorite" DB is performed. If there is the change, when the name is overlapped to the name of existing another "favorite" (YES in step S1420), whether it is overwritten or not is confirmed to the user (step S1421).

If the name is overwritten (YES in step S1421), it is replaced with the existing "favorite" and registered (step S1422). If "favorite" of the same name does not exist (NO in step S1420), the edited contents are registered in the "favorite" DB as it is.

[Process for Setting Device Option]

Figure 17:
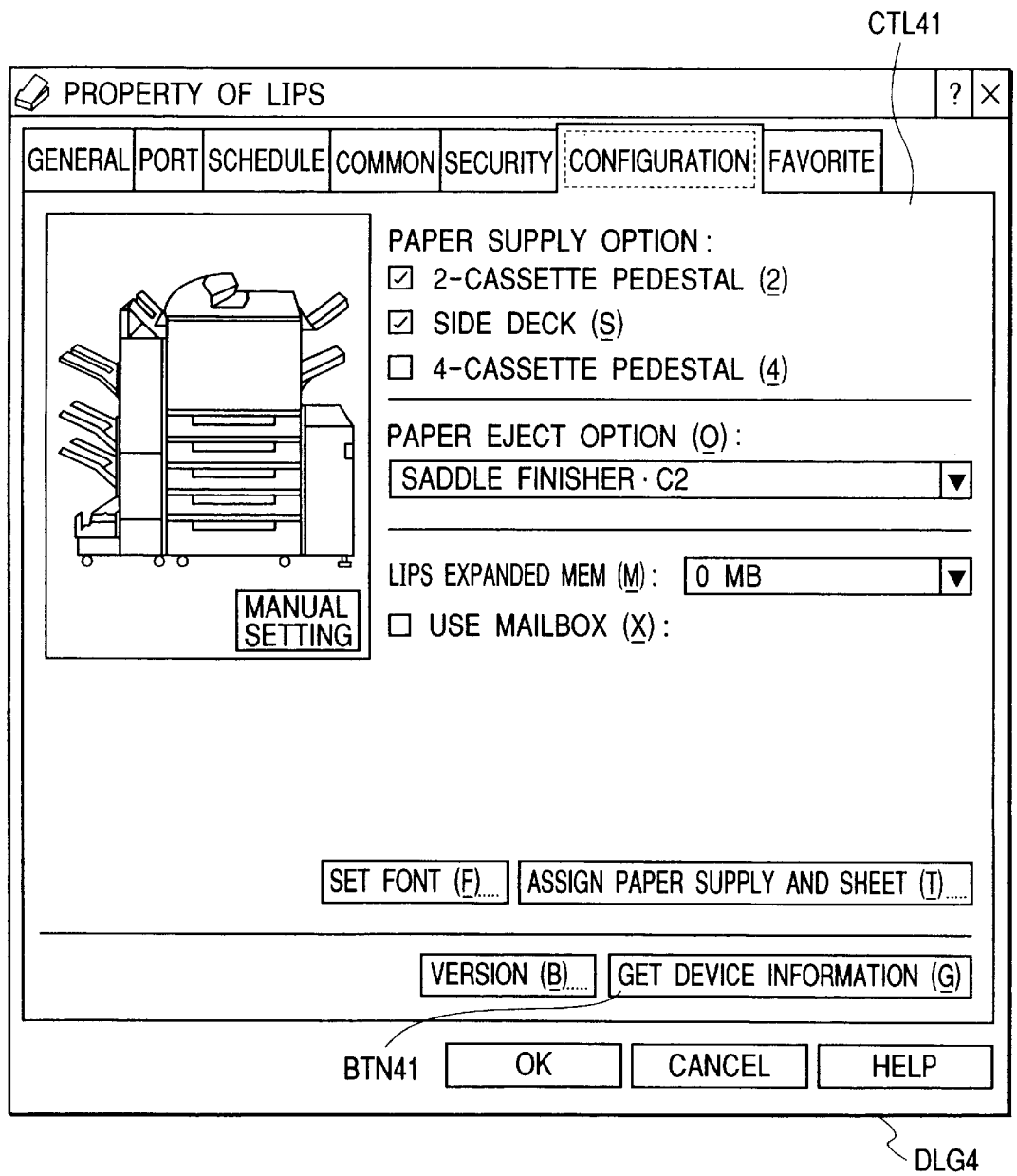
FIG. 17 is a diagram showing an example of a dialog for setting a device option.
Figure 18:
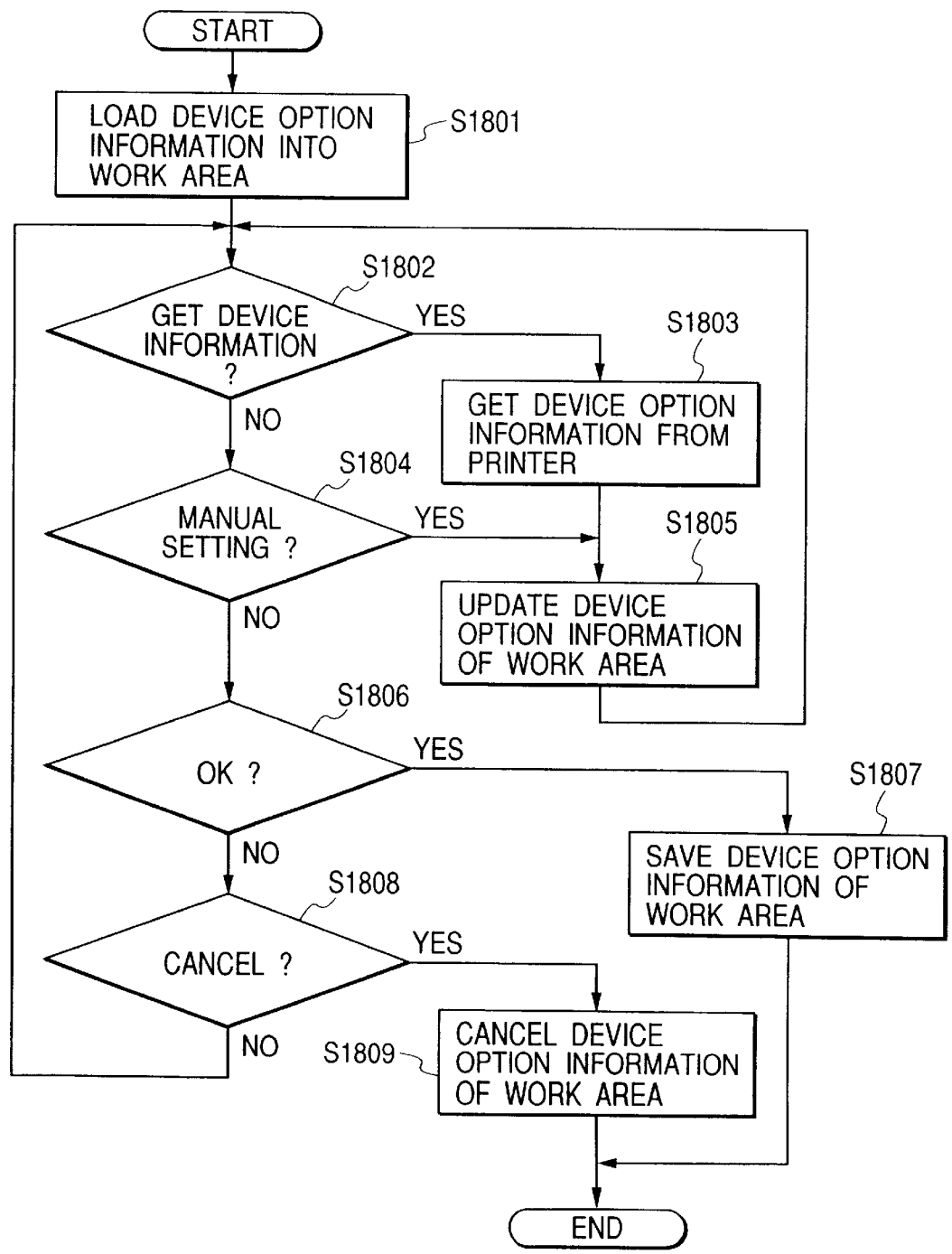
FIG. 18 is a diagram showing a flowchart for processes when the device option is set.
Figure 19:
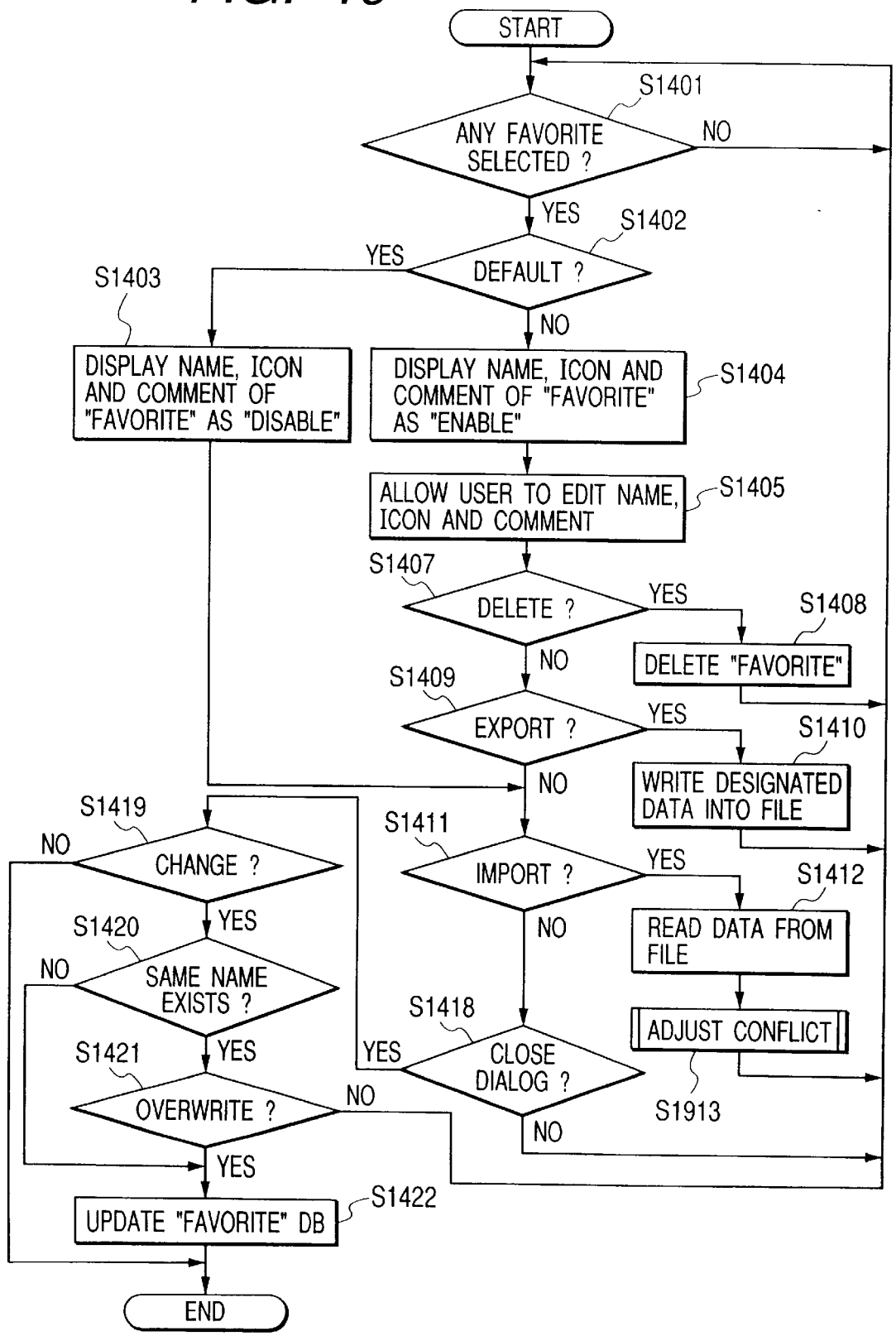
FIG. 19 is a diagram showing a flowchart for processes at the time of the "favorite" edition.

Processes when the user sets the setting items of "favorite", particularly, the set contents (set values) of the setting items of the device option in step S410 or the like in the flowchart of FIG. 4 will now be described with reference to the example of the dialog in FIG. 17 and a flowchart of FIG. 18. DLG4 shown in FIG. 17 is an example of a dialog to confirm and set a device option equipped for the printer or copying machine.

Device option information which the program has at present is first loaded into a work area from a device option registering portion (registered in the registry or a specific memory) (step S1801) and the dialog DLG4 is displayed on the basis of this information.

When a "get device information" button BTN41 is depressed by the user (YES in step S1802), the information of the device option actually equipped is obtained from the device main body by a bidirectional communication with the device (step S1803). The device option information loaded in the work area is updated and reflected to the display of the dialog DLG4 (step S1805).

The manual setup by the user is also possible. When the user changes the setup by CTL41 (YES in step S1804), the information of the set device option is held in the work area (step S1805).

When the "OK" button is depressed (YES in step S1806), the device option information held at present in the work area is saved in the device option registering portion (step S1807). When the "cancel" button is depressed (YES in step S1808), the device option information in the work area is cancelled (step S1808) and the processing routine on this sheet is, finished.

When the importing process (steps S1411 to S1412) is executed in the editing flow in FIG. 14, it is also possible to perform the conflict check and adjust the setup and subsequently register it. A processing flow in this case will be described hereinbelow with reference to a flowchart of FIG. 19.

Figure 14:
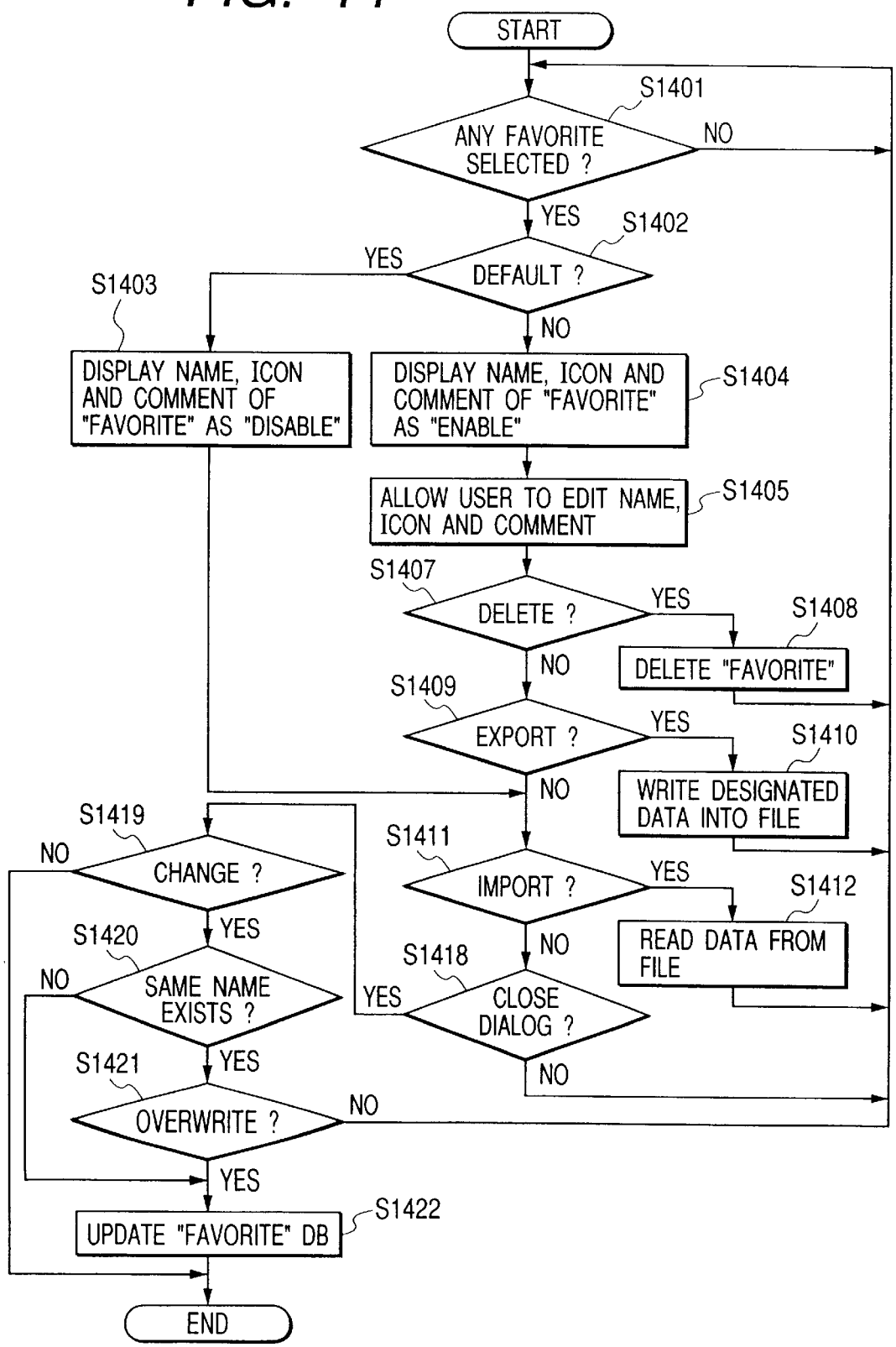
FIG. 14 is a diagram showing a flowchart for processes at the time of the "favorite" edition.

This flow differs from that of FIG. 14 with respect to a point that a conflict process in step S1913 is added. Since the subsequent processes are similar to those in FIG. 14, their descriptions are omitted here. When data is read out from the file, by registering the set contents (set values) after the device conflict was checked, formed "favorite" becomes "favorite" suitable for the current device environment. As for the conflict check, fundamentally, a process similar to that described in a flowchart of FIG. 7 is executed.

In the importing process, there is a process to ask the user whether the adjusting process should be performed or not. Therefore, by performing the adjusting process, the "favorite" becomes one suitable for the current device environment as mentioned above. Even if "favorite" is subsequently selected, no conflict message is displayed. Unless the adjusting process is performed upon importing, the original setup can be copied as it is.

The invention can be applied to a system comprising a plurality of apparatuses (for example, host computer, interface equipment, reader, printer, and the like) or can be also applied to an apparatus comprising one device (for example, copying machine, facsimile apparatus, or the like).

The objects of the invention are also obviously accomplished by a method whereby a memory medium in which program codes of software to realize the functions of the first and second embodiment have been recorded is supplied to the system or apparatus shown in FIG. 1 or 2 and a computer (or a CPU or MPU) of the system or apparatus reads out and executes the program codes stored in the memory medium.

In this case, the program codes themselves read out from the memory medium realize the functions of the embodiments mentioned above and the memory medium in which the program codes have been stored constructs the invention. FIG. 20 shows a memory map of a state Where the program of the invention has been loaded in the RAM 2 in FIG. 2 and can be executed.

Although the embodiment has been shown with respect to the example in which the present program and concerned data are directly loaded from the memory, medium into the RAM and executed, it is also possible to construct the apparatus in a manner such that the present program and concerned data are once stored; (installed) from an external memory medium such as an FD or the like to a hard disk serving as a non-volatile memory medium in the external memory 12 in FIG. 2 and, when the present data forming and transmitting processing control programs are made operative, they are loaded from the hard disk into the RAM 2.

As a memory medium to supply the program codes, for example, it is possible to use a floppy disk, a hard disk, an optical disk, a magnetooptic disk, a CD-ROM, a CD-R, a magnetic tape, a non-volatile memory card, an ROM, or the like. The invention incorporates not only the case where the functions of the embodiments mentioned above are realized by executing the read-out program codes by the computer but also the case where the OS (Operating System) or the like which operates on the computer executes a part or all of the actual processes on the basis of instructions of the program codes and the functions of the embodiments mentioned above are realized by the processes.

Further, the invention also incorporates the case where the program codes read out from a memory medium are written in a memory equipped for a function expanding board inserted in a computer or a function expanding unit connected to the computer and, after that, a CPU or the like equipped for the function expanding board or function expanding unit executes a part or all of the actual processes on the basis of instructions of the program codes, and the functions of the embodiments mentioned above are realized by the processes.

In case of applying the invention to the memory medium, although the program codes corresponding to the flowcharts described above are stored in the memory medium, when briefly explaining, each module shown in the memory map example of FIG. 20 is stored in the memory medium.

Even in the case where when "favorite" is selected, the device conflict is checked, so that the user converts the set contents upon printing in a lump by using "favorite", the matched print setup can be always performed to the device option of the device apparatus. Even when the adjusting process of the set contents (installation values) is automatically performed, the user can know its situation by a message.

Since the device conflict is checked and the adjusting process of the set contents (set values) is performed even upon importing of "favorite", it is. possible to avoid that the user feels troublesomeness such that the message is displayed every time he selects "favorite". This function is particularly effective in the case where "favorite" is copied to a quite different device environment. Since the user can select whether the set contents (set values) are adjusted upon importing or not, the original set contents can be left without performing the adjusting process.

What is claimed is:

1. An information processing apparatus for performing an output setup to a device apparatus by using a compound setup including a combination of a plurality of setting items, comprising:

selecting means for selecting a compound setup for a designated device apparatus if a plurality of compound setups are present that are available for a plurality of device apparatuses;

discriminating means for discriminating whether an output process is executable with the setting items included in the compound setup in the designated device apparatus in accordance with a function of the device apparatus in response to said selecting means selecting the compound setup for the device apparatus; and transmission control means for controlling a transmission process such that if said discriminating means discriminates that the output process is not executable, contents of the selected compound setup are not transmitted to the designated device apparatus.

2. An apparatus according to claim 1, further comprising setting means for setting the compounds setup, wherein when said discriminating means discriminates that the output process is not executable, said setting means changes each of the setting items with which the output process is not executable to a setting item with which the output process is executable.

3. An apparatus according to claim 2, further comprising notifying means for, responsive to said setting means changing the setting items, notifying the user of its situation.

4. An apparatus according to claim 2, further comprising change selecting means for, when said setting means changes the setting items, allowing the user to select its replacing method.

5. An apparatus according to claim 2, further comprising display control means for, when said setting means changes the setting items, controlling a display unit to display a dialog for allowing the user to confirm setting item change results.

6. An apparatus according to claim 1, further comprising function memory means for storing the function of said device apparatus.

7. An apparatus according to claim 1, wherein the function of said device apparatus relates to the presence or absence of an installation of said device apparatus.

8. An apparatus according to claim 1, wherein the function of said device apparatus is a two-sided printing function of said device apparatus.

9. An apparatus according to claim 1, wherein the function of said device apparatus is a stapling function of said device apparatus.

10. An apparatus according to claim 1, wherein the function of said device apparatus is a bookbinding printing function of said device apparatus.

11. An apparatus according to claim 1, wherein the function of said device apparatus is a function regarding cassette stages of said device apparatus.

12. An apparatus according to claim 1, wherein the function of said device apparatus is a function regarding a memory capacity of said device apparatus.

13. An apparatus according to claim 1, wherein in case of performing said output setup in a user interface by using a plurality of setup sheets, said compound setup is a combination of said plurality of setting items over said plurality of setup sheets.

14. An apparatus according to claim 1, wherein said output setup is an output setup in a printer driver.

15. An apparatus according to claim 1, wherein said output setup is an output setup in a printer driver by a printing operation in an application.

16. An information processing apparatus for performing an output setup to a device apparatus by using a compound setup including a combination of a plurality of setting items, comprising:

instruction means for providing an instruction for input of a compound setup provided in a form available for a plurality of device apparatuses and stored in one data set;

selecting means for selecting a compound setup for a designated device apparatus from among at least one compound setup input in accordance with the instruction provided by said instruction means;

discriminating means for discriminating whether an output process is executable with the setting items included in the compound setup in the designated device apparatus in accordance with a function of the device apparatus in response to said selecting means selecting the compound setup for the device apparatus; and transmission control means for controlling a transmission process such that if said discriminating means discriminates that the output process is not executable, contents of the selected compound setup are not transmitted to the designated device apparatus.

17. An apparatus according to claim 16, further comprising changing means, wherein when said discrimination means discriminates that the output process is not executable, said changing means changes each of the setting items with which the output process is not executable to a setting item with which the output process is executable.

18. An apparatus according to claim 17, further comprising notifying means for, responsive to said changing means changing the setting items, notifying the user of its situation.

19. An apparatus according to claim 17, further comprising change selecting means for, when said changing means changes the setting items, allowing the user to select its replacing method.

20. An apparatus according to claim 17, further comprising confirming means for, when said changing means changing the setting items, allowing the user, prior to transmission of a job to the device apparatus, to confirm whether the change is to be executed.

21. An information processing method of performing an output setup to a device apparatus by using a compound setup including a combination of a plurality of setting items, comprising:

a selecting step of selecting a compound setup for a designated device apparatus if a plurality of compound setups are present that are available for a plurality of device apparatuses;

a discriminating step of discriminating whether an output process is executable with the setting items included in the compound setup in the designated device apparatus in accordance with a function of the device apparatus in response to said compound setup selected in said selecting step selecting the compound setup for the device apparatus; and a transmission control step, of controlling a transmission process such that if said discriminating step includes discriminating that the output process is not executable, contents of the selected compound setup are not transmitted to the designated device apparatus.

22. A method according to claim 21, further comprising a setting step, of setting the compound setup, wherein when it is discriminated in said discrimination step that the output process is not executable, then in said setting step, each of the setting items with which the output process is not executable is changed to a setting item with which the output process is executable.

23. A method according to claim 22, further comprising a notifying step of, responsive to said setting step changing the setting items, notifying the user of its situation.

24. A method according to claim 22, further comprising a change selecting step of, when said setting step changes the setting items, allowing the user to select its replacing method.

25. A method according to claim 22, further comprising a display control step of, when said setting step changes the setting items, controlling a display unit to display a dialog for allowing the user to confirm setting item change results.

26. A method according to claim 21, further comprising a function storing step of storing the function of said device apparatus into memory means.

27. A method according to claim 21, wherein the function of said device apparatus relates to the presence or absence of an installation of said device apparatus.

28. A method according to claim 21, wherein the function of said device apparatus is a two-sided printing function of said device apparatus.

29. A method according to claim 21, wherein the function of said device apparatus is a stapling function of said device apparatus.

30. A method according to claim 21, wherein the function of said device apparatus is a bookbinding printing function of said device apparatus.

31. A method according to claim 21, wherein the function of said device apparatus is a function regarding cassette stages of said device apparatus.

32. A method according to claim 21, wherein the function of said device apparatus is a function regarding a memory capacity of said device apparatus.

33. A method according to claim 21, wherein in case of performing said output setup in a user interface by using a plurality of setup sheets, said compound setup is a combination of said plurality of setting items over said plurality of setup sheets.

34. A method according to claim 21, wherein said output setup is an output setup in a printer driver.

35. A method according to claim 21, wherein said output setup is an output setup in a printer driver by a printing operation in an application.

36. A information processing method for performing an output setup to a device apparatus by using a compound setup including a combination of a plurality of setting items, comprising the steps of:

instructing for input of a compound setup provided in a form available for a plurality of device apparatuses and stored in one data set;

selecting a compound setup for a designated device apparatus from among at least one compound setup input in accordance with the instruction provided in said instructing step;

discriminating whether an output process is executable with the setting items included in the compound setup in the designated device apparatus in accordance with a function of the device apparatus in response to said selecting step selecting the compound setup for the device apparatus; and controlling a transmission process such that if it is discriminated in said discriminating step that the output process is not executable, contents of the selected compound setup are not transmitted to the designated device apparatus.

37. A method according to claim 36, further comprising changing step of, when it is discriminated in said discriminating step that the output process is not executable changing each of the setting items with which the output process is not executable to a setting item with which the output process is executable.

38. A method according to claim 37, further comprising a notifying step of, responsive to said changing step changing the setting items, notifying the user of its situation.

39. A method according to claim 37, further comprising a change selecting step of, when said changing step changes the setting items, allowing the user to select its replacing method.

40. A method according to claim 37, further comprising a confirming step of, when said changing step changes the setting items, allowing the user, prior to transmission of a job to the device apparatus, to confirm whether the change is to be executed.

41. An information processing program for performing an output setup to a device apparatus by using a compound setup including a combination of a plurality of setting items, comprising:

a selecting step, of selecting a compound setup for a designated device apparatus if a plurality of compound setups are present that are available for a plurality of device apparatuses;

a discriminating step, of discriminating whether an output process is executable with the setting items including in the compound setup in the designated device apparatus in accordance with a function of the device apparatus in response to said compound setup selected in said selecting step selecting the compound setup for the device apparatus; and a transmission control step, of controlling a transmission process such that if it is discriminated in said discriminating step that the output process is not executable, contents of the selected compound setup are not transmitted to the designated device apparatus.

42. A program according to claim 41, further comprising a setting step, of setting the compound setup, wherein when it is discriminated in said discriminating step that the output process is not executable, in said setting step, each of the setting items with which the output process is not executable is changed to a setting item with which the output process is executable.

43. A program according to claim 42, further comprising a notifying step of, responsive to said setting step changing the setting items, notifying the user of its situation.

44. A program according to claim 42, further comprising a change selecting step of, when said setting step changes the setting items, allowing the user to select its replacing method.

45. A program according to claim 42, further comprising a display control step of, when said setting step changes the setting items, controlling a display unit to display a dialog for allowing the user to confirm setting item change results.

46. A program according to claim 41, further comprising a function storing step of storing the function of said device apparatus into memory means.

47. A program according to claim 41, wherein the function of said device apparatus relates to the presence or absence of an installation of said device apparatus.

48. A program according to claim 41, wherein the function of said device apparatus is a two-sided printing function of said device apparatus.

49. A program according to claim 41, wherein the function of said device apparatus is a stapling function of said device apparatus.

50. A program according to claim 41, wherein the function of said device apparatus is a bookbinding printing function of said device apparatus.

51. A program according to claim 41, wherein the function of said device apparatus is a function regarding cassette stages of said device apparatus.

52. A program according to claim 41, wherein the function of said device apparatus is a function regarding a memory capacity of said device apparatus.

53. A program according to claim 41, wherein in case of performing said output setup in a user interface by using a plurality of setup sheets, said compound setup is a combination of said plurality of setting items over said plurality of setup sheets.

54. A program according to claim 41, wherein said output setup is an output setup in a printer driver.

55. A program according to claim 41, wherein said output setup is an output setup in a printer driver by a printing operation in an application.

56. A information processing program for performing an output setup to a device apparatus by using a compound setup including a combination of a plurality of setting items, comprising
an instructing step, of providing an instruction for input of a compound setup provided in a form available for a plurality of device apparatuses and stored in one data set;
a selecting step, of selecting a compound setup for a designated device apparatus from among at least one compound setup input in accordance with the instruction provided in said instructing step;
a discriminating step, of discriminating whether an output process is executable with the setting items included in the compound setup in the designated device apparatus in accordance with a function of the device apparatus in response to said selecting step selecting the compound setup for the device apparatus; and
a transmission control step, of controlling a transmission process such that if it is discriminated in said discriminating step that the output process is not executable, contents of the selected compound setup are not transmitted to the designated device apparatus.

57. A program according to claim 56, further comprising a changing step, wherein when it is discriminated in said discriminating step that the output process is not executable, said changing step changes each of the setting items with which the output process is not executable to a setting item with which the output process is executable.

58. A program according to claim 57, further comprising a notifying step of, responsive to said changing step changing the setting items, notifying the user of its situation.

59. A program according to claim 57, further comprising a change selecting step of, when said changing step changes the setting items, allowing the user to select its replacing method.

60. A program according to claim 57, further comprising a confirming step of, when said changing step changes the setting items, allowing the user, prior to transmission of a job to the device apparatus, to confirm whether the change is to be executed.

61. A computer-readable recording medium which stores an information processing program for performing an output setup to a device apparatus by using a compound setup including a combination of a plurality of setting items, wherein said information processing program comprises:
a selecting step, of selecting a compound setup for a designated device apparatus if a plurality of compound setups are present that are available for a plurality of device apparatuses;
a discriminating step, of discriminating whether an output process is executable with the setting items included in the compound setup in the designated device apparatus in accordance with a function of the device apparatus in response to said compound setup selected in said selecting step selecting the compound setup for the device apparatus; and
a transmission control step, of controlling a transmission process such that if it is discriminated in said discriminating step that the output process is not executable, contents of the selected compound setup are not transmitted to the designated device apparatus.

62. A medium according to claim 61, further comprising a setting step, wherein when it is discriminated in said discriminating step that the output process is not executable, then in said setting step, each of the setting items with which the output process is not executable is changed to a setting item with which the output process is executable.

63. A medium according to claim 62, wherein said information processing program further comprises a notifying step of, responsive to said setting step changing the setting items in accordance with the function of said device apparatus, notifying the user of its situation.

64. A medium according to claim 62, wherein said information processing program further comprises a change selecting step of, when said setting step changes the setting items, allowing the user to select its replacing method.

65. A medium according to claim 62, wherein said information processing program further comprises a display control step of, when said setting step changes the setting items, controlling a display unit to display a dialog for allowing the user to confirm setting item change results.

66. A medium according to claim 61, wherein said information processing program further comprises a function storing step of storing the function of said device apparatus into memory means.

67. A medium according to claim 61, wherein the function of said device apparatus relates to the presence or absence of an installation of said device apparatus.

68. A medium according to claim 61, wherein the function of said device apparatus is a two-sided printing function of said device apparatus.

69. A medium according to claim 61, wherein the function of said device apparatus is a stapling function of said device apparatus.

70. A medium according to claim 61, wherein the function of said device apparatus is a bookbinding printing function of said device apparatus.

71. A medium according to claim 61, wherein the function of said device apparatus is a function regarding cassette stages of said device apparatus.

72. A medium according to claim 61, wherein the function of said device apparatus is a function regarding a memory capacity of said device apparatus.

73. A medium according to claim 61, wherein in case of performing said output setup in a user interface by using a plurality of setup sheets, said compound setup is a combination of said plurality of setting items over said plurality of setup sheets.

74. A medium according to claim 61, wherein said output setup is an output setup in a printer driver.

75. A medium according to claim 61, wherein said output setup is an output setup in a printer driver by a printing operation in an application.

76. An information processing medium which stores an information processing program for performing an output setup to a device apparatus by using a compound setup including a combination of a plurality of setting items, wherein said information processing program comprises:

- an instructing step, of providing an instruction for input of a compound setup provided in a form available for a plurality of device apparatuses and stored in one data set;
- a selecting step, of selecting a compound setup for a designated device apparatus from among at least one compound setup input in accordance with the instruction provided in said instructing step;
- a discriminating step, of discriminating whether an output process is executable with the setting items included in the compound setup in the designated device apparatus in accordance with a function of the device apparatus in response to said selecting step selecting the compound setup for the device apparatus; and
- a transmission control step, of controlling a transmission process such that if it is discriminated in said discriminating step that the output process is not executable, contents of the selected compound setup are not transmitted to the designated device apparatus.

77. A medium according to claim 76, further comprising a changing step, wherein in said reading step, when it is discriminated in said discrimination step that the output process is not executable, said changing step changes each of the setting items with which the output process is not executable to a setting item with which the output process is executable.

78. A medium according to claim 77, wherein said information processing program further comprises a notifying step of, responsive to said changing step changing the setting items, notifying the user of its situation.

79. A medium according to claim 77, wherein said information processing program further comprises a change selecting step of, when said changing step changes the setting items, allowing the user to select its replacing method.

80. A medium according to claim 77, wherein said information processing program further comprises a confirming step of, when said changing step changes the setting items, allowing the user to confirm whether the changes is to be executed.

* * * * *

UNITED STATES PATENT AND TRADEMARK OFFICE
CERTIFICATE OF CORRECTION

PATENT NO. : 6,563,519 B1
DATED : May 13, 2003
INVENTOR(S) : Tomonori Minagawa

It is certified that error appears in the above-identified patent and that said Letters Patent is hereby corrected as shown below:

Column 1,
Line 27, "values-of" should read -- values of --.
Line 28, "to" should read -- into --.

Column 2,
Line 66, "land" should read -- and --.

Column 4,
Line 42, "An embodiment" should read -- Embodiments --.
Line 47, "displays" should read -- display, --.
Line 65, "key," should read -- key --.

Column 5,
Line 66, "be," should read -- be --.

Column 8,
Line 9, "using, the" should read -- using the --.
Line 66, "t he" should read -- the --.
Line 67, "a" should read -- an --.

Column 9,
Line 47, "is," should read -- is --.

Column 10,
Line 11, "embodiment" should read -- embodiments --.
Line 19, "Where" should read -- where --.
Line 23, "memory," should read -- memory --.
Line 26, "stored;" should read -- stored --.

Column 11,
Line 3, "is." should read -- is --.
Line 32, "compounds" should read -- compound --.

Column 14,
Line 13, "comprising" should read -- comprising a --.
Line 15, "executable" should read -- executable, --.
Line 41, "including" should read -- included --.

UNITED STATES PATENT AND TRADEMARK OFFICE
CERTIFICATE OF CORRECTION

PATENT NO. : 6,563,519 B1
DATED : May 13, 2003
INVENTOR(S) : Tomonori Minagawa

It is certified that error appears in the above-identified patent and that said Letters Patent is hereby corrected as shown below:

Column 15,
Line 32, "A" should read -- An --.
Line 35, "comprising" should read -- comprising: --

Column 18,
Line 26, "is" should read -- are --.

Signed and Sealed this

Eleventh Day of November, 2003

JAMES E. ROGAN
*Director of the United States Patent and Trademark Office*